Aug. 5, 1969    O. G. BARNUM    3,459,437
HEAVY-DUTY VEHICLE
Filed Aug. 29, 1966      4 Sheets-Sheet 1
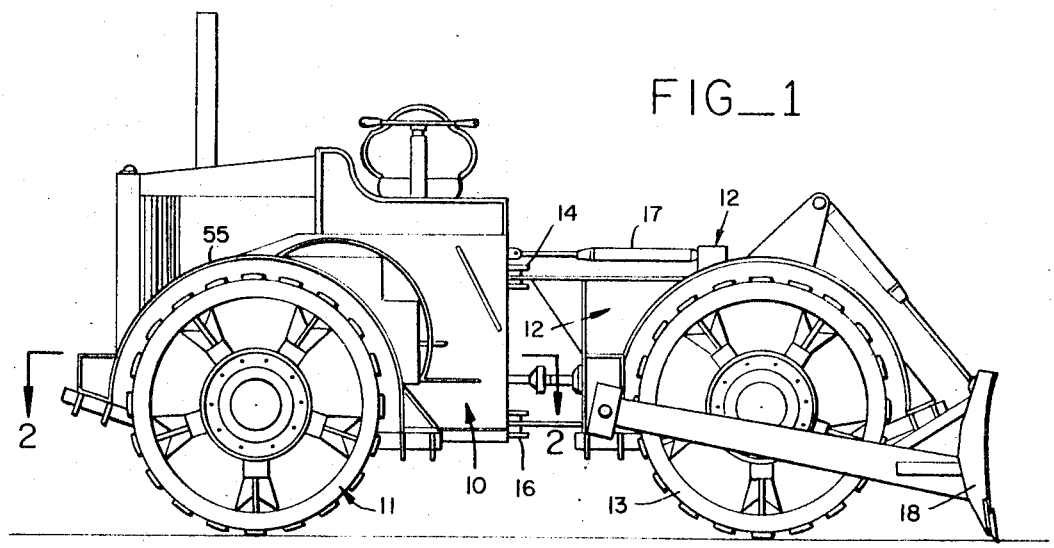
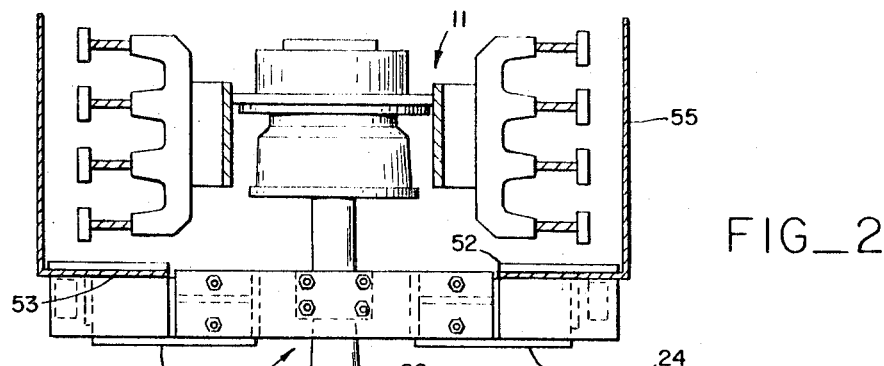
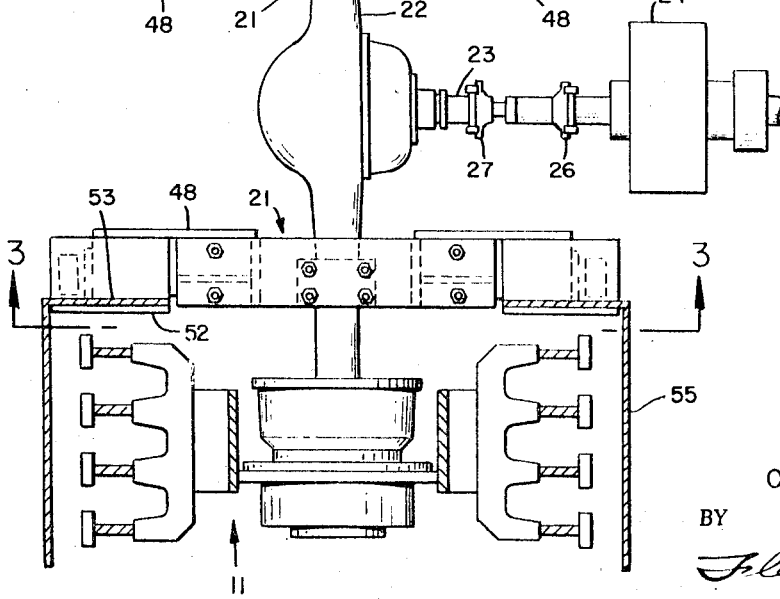
INVENTOR.
ORVILLE G. BARNUM
BY
*Fletcher and Swain*
ATTORNEYS

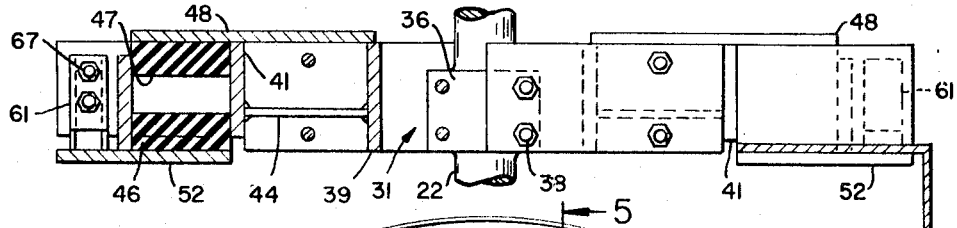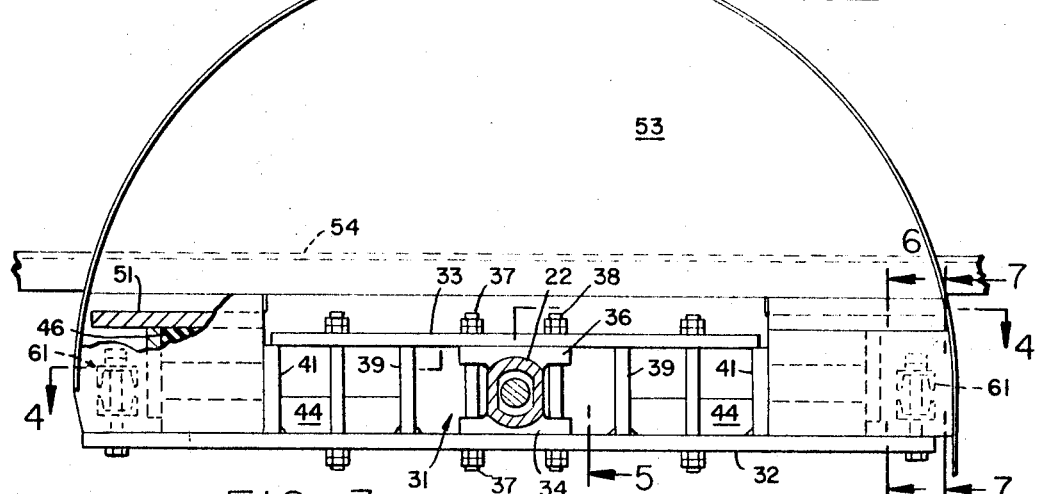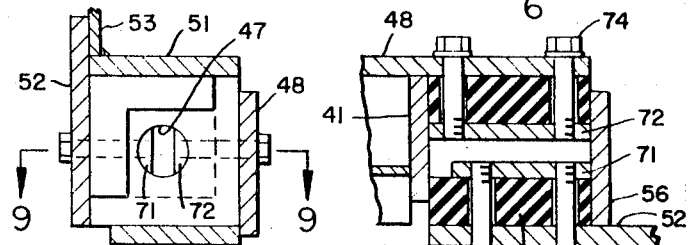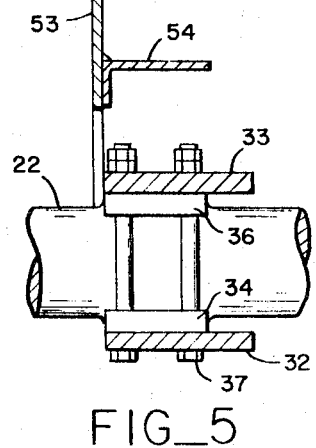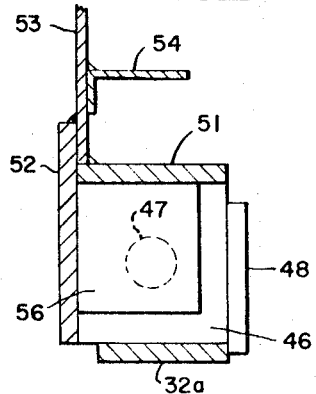

Aug. 5, 1969　　　O. G. BARNUM　　　3,459,437
HEAVY-DUTY VEHICLE
Filed Aug. 29, 1966　　　　　　　　　　　　　4 Sheets-Sheet 3
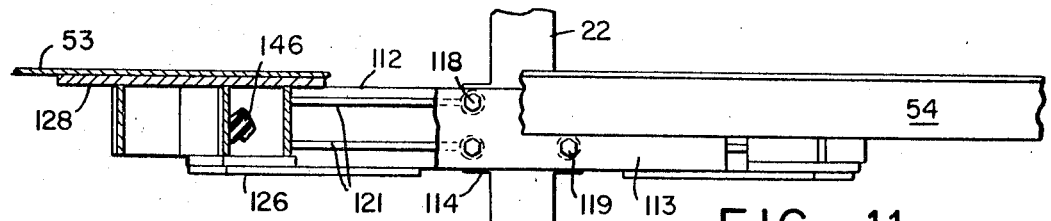
FIG_11
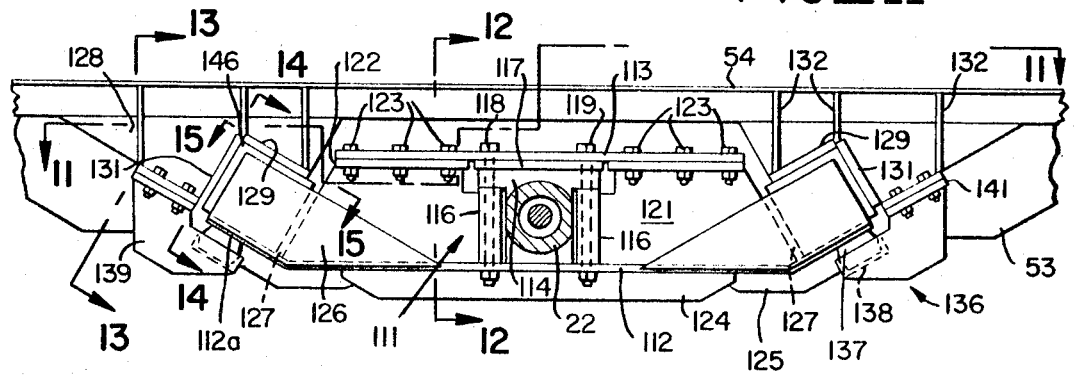
FIG_10
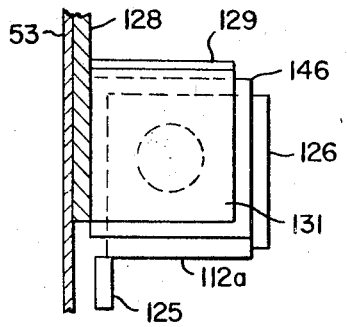
FIG_14
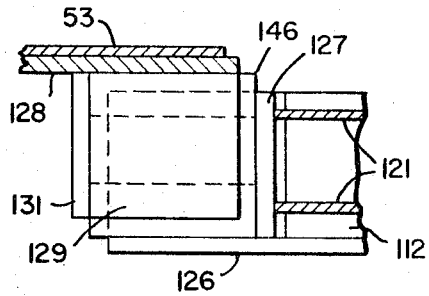
FIG_15
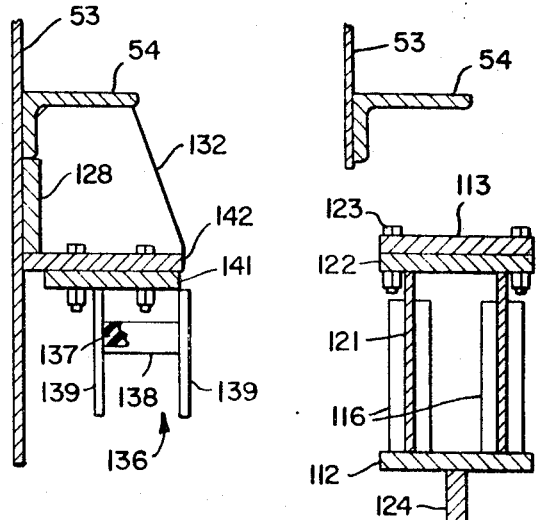
FIG_13　　FIG_12
INVENTOR.
ORVILLE G. BARNUM
BY
ATTORNEYS Aug. 5, 1969      O. G. BARNUM      3,459,437
HEAVY-DUTY VEHICLE
Filed Aug. 29, 1966      4 Sheets-Sheet 4
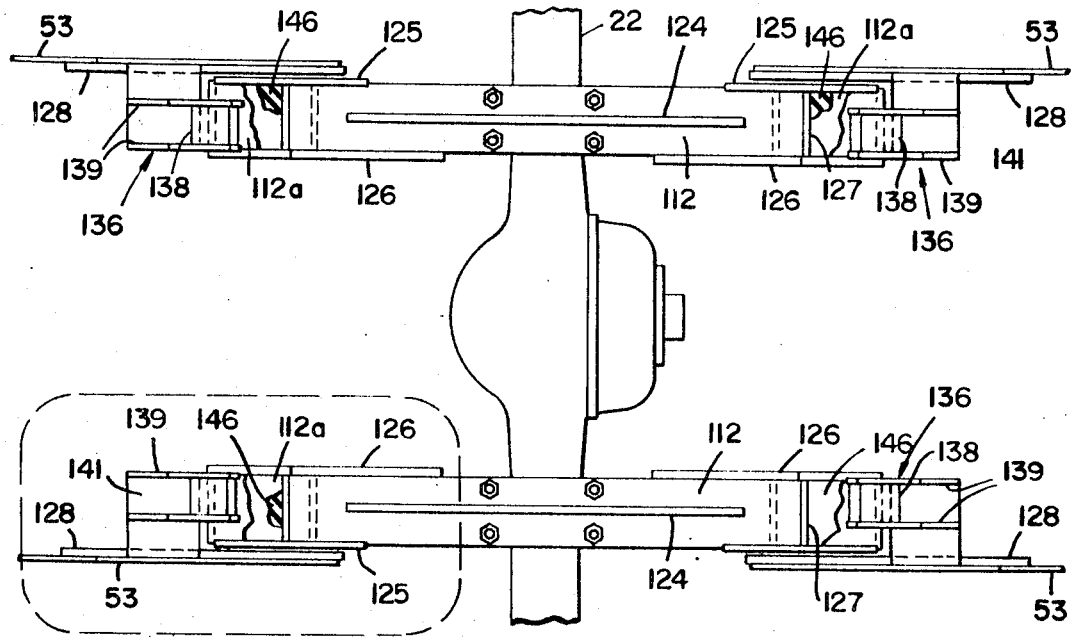
FIG_16
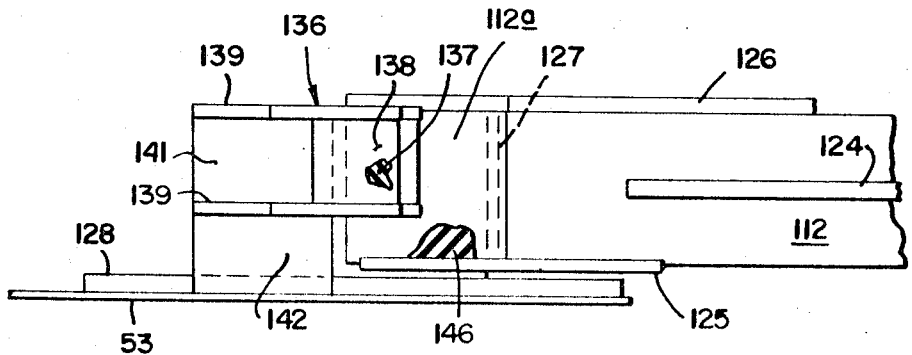
FIG_17
INVENTOR.
ORVILLE G. BARNUM
BY
ATTORNEYS United States Patent Office 3,459,437
Patented Aug. 5, 1969

3,459,437
HEAVY-DUTY VEHICLE
Orville G. Barnum, South San Francisco, Calif., assignor, by mesne assignments, to Rex Chainbelt Inc., Milwaukee, Wis., a corporation of Wisconsin
Continuation-in-part of application Ser. No. 512,424, Dec. 8, 1965. This application Aug. 29, 1966, Ser. No. 579,449
Int. Cl. E02f 3/76
U.S. Cl. 280—124                                    4 Claims

ABSTRACT OF THE DISCLOSURE

Suspension units for mounting axle assemblies to frames of self-propelled vehicles of off-the road, heavy duty types are disclosed. Rigid beams are mounted on the axle longitudinally of the vehicle and rigid frame supports overlie the beams. A block of resilient material is mounted at each end of the beams (four for each axle unit) and are there retained in a box-like housing furnished by portions of the beam and the frame to align the axle both longitudinally and laterally with the vehicle. In one form of the invention the blocks of resilient material are disposed in a horizontal attitude while in another form they are inclined upwardly to furnish a self-centering action in assembling the frame to the axle. A resilient torque reaction device is interposed between the ends of each beam structure and the frame supporting members for resisting rotational movement of the beam structure connected to the axle with respect to the frame.

---

The present application is continuation-in-part of my application Serial No. 512,424 filed December 8, 1965, now abandoned.

This invention relates generally to self-propelled vehicles of the heavy-duty type, such as earth compactor, earth moving machines, and the like.

The power train of self-propelled compactors and other heavy-duty vehicles is subject to intense shocks due to the severe operating conditions to which they are subjected. For example, such vehicles are commonly operated over rough and uneven terrain at speeds which necessarily involve shock forces of high magnitude. Also they are subjected to sudden starting and stopping, to rapid changes in speed, and sudden reversals.

The more conventional spring suspensions, such as are used on various automotive vehicles, are not suitable for such heavy duty equipment because they are not constructed in such a manner as to withstand the severe loads and shock forces involved. Also they are not capable of resisting the relatively heavy torques developed between the drive axle assembly and the machine frame under various operating conditions.

In general it is an object of the present invention to provide a heavy-duty vehicle having a cushioning suspension capable of adequately isolating the power train and other components from shock.

Another object of the invention is to provide a vehicle with a cushion suspension that is capable of withstanding all of the severe loads and shocks to which a heavy-duty vehicle of the compactor type is subjected.

Another object of the invention is to provide a heavy-duty vehicle having improved suspension means characterized by the use of blocks made of resilient material, in contrast with the more conventional springs.

Another object of the invention is to provide a heavy-duty vehicle of the above character having resilient suspension means which facilitate alignment of the machine frame to the axle assembly during installation and which maintains substantially such alignment during service.

Another object of the invention is to provide a heavy-duty vehicle of the above character having novel means in conjunction with a cushioning suspension for adequately handling the severe torques developed between the axle assembly and the machine frame.

Additional objects and features of the invention will appear from the following description in which the preferred embodiments have been set forth in detail in conjunction with the accompanying drawing.

Referring to the drawings:

FIGURE 1 is a side elevational view showing a compactor of the type to which my invention is applicable;

FIGURE 2 is a cross-sectional view on an enlarged scale taken along the line 2—2 of FIGURE 1, showing portions of the cushioning suspension;

FIGURE 3 is a view taken along the line 3—3 of FIGURE 2 on an enlarged scale and partially in section;

FIGURE 4 is a view partially in cross-section taken along the line 4—4 of FIGURE 3;

FIGURE 5 is a cross-sectional view taken along the line 5—5 of FIGURE 3;

FIGURE 6 is a cross-sectional detail taken along the line 6—6 of FIGURE 3;

FIGURE 7 is a cross-sectional detail on a further enlarged scale taken along the line 7—7 of FIGURE 3;

FIGURE 8 is a cross-sectional detail similar to FIGURE 6 but showing another embodiment;

FIGURE 9 is a cross-sectional detail taken along the line 9—9 of FIGURE 8;

FIGURE 10 is a view taken like FIGURE 3 but showing another embodiment of the invention;

FIGURE 11 is a view partially in section taken along the line 11—11 of FIGURE 10;

FIGURE 12 is a cross-sectional view taken along the line 12—12 of FIGURE 10;

FIGURE 13 is a cross-sectional detail taken along the line 13—13 of FIGURE 10;

FIGURE 14 is a cross-sectional detail on an enlarged scale taken along the line 14—14 of FIGURE 10;

FIGURE 15 is a cross-sectional detail taken along the line 15—15 of FIGURE 10;

FIGURE 16 is a fragmentary plan view, partially broken away, looking upwardly from below the vehicle axle and suspension systems of the embodiment shown in FIGURE 10; and FIGURE 17 is a further enlarged fragmentary view of the portion enclosed by the broken lines in FIGURE 16.

The compactor illustrated in FIGURE 1 consists of a main body part 10 carried by the ground-engaging wheels 11. The wheels may vary in accordance with operating conditions, but by way of example may be cushioned wheels of the type disclosed and claimed in my copending application Ser. No. 396,300 filed Sept. 14, 1964. A second body part 12 is provided with relatively closely set ground-engaging wheels 13. The pivotal connections 14 and 16 between the two body parts permit articulation about a vertical axis to steer the vehicle. Steering forces may be provided by the hydraulic rams 17. One end of the vehicle may be provided with the vertically adjustable bulldozer blade 18.

The main body part 10 carries the driving motor which is operatively connected to the wheels through a change gear transmission and differential. The two units 21 of the cushioning suspension (FIGURE 2) are operatively connected between the axle assembly 22 and the frame of the main body part 10. The axle assembly 22 may be conventional and includes the axle which is connected to the wheels 11, and differential gearing connected to the drive shaft 23. The drive shaft is driven from a change gear transmission indicated schematically at 24, through the universal couplings 26 and 27.

The suspension units 21 are duplicates and are constructed as shown in FIGURES 3 and 4 or preferably as shown in FIGURES 10–15. In the case of the embodiment shown in FIGURES 3 and 4, each unit consists of a rigid beam-like structure 31 which is clamped to the housing of the axle assembly 22. While the structure may be made of a suitable rigid casting, it is shown fabricated from structural steel members. Thus, the lower member 32 formed of steel plate extends across the lower side of the axle assembly. An upper member 33 likewise of steel plate extends across the upper side of the axle assembly. The axle assembly includes as integral portions pad members 34 and 36, which are engaged by the members 32 and 33, respectively, and are clamped tightly upon the axle assembly by the clamping bolts 37 and 38. Upstanding stiffening walls 39 are shown attached by welding to member 32 and have their upper ends in abutting engagement with the upper member 33. Also upstanding walls 41 are secured as by welding to member 32, and have their upper ends in engagement with the extremities of member 33. Reinforcing webs 44 are shown extending between and welded to the walls 39 and 41.

The ends of each beam structure 31 are in cooperative relation with members that are attached to the main frame of the body part 10, through cushioning members made of suitable resilient material. Such cushioning members can be in the form of blocks 46 made of material having good resiliency and recovery and capable of withstanding the conditions to which the vehicle is subjected. For example, the material may be a high quality synthetic rubber of the buna type, or other suitable synthetic rubbers or elastomers. The block is constructed solid but may be provided with a central opening 47.

Each end portion 32a (FIGURE 6) of member 32 underlies and serves to seat a corresponding block 46. A wall 48 is secured as by welding to each end portion 32a, and provides a vertically extending surface against which one side of the block 46 engages. The end of each block 46 nearest the axle assembly engages the surface provided by the wall 41.

FIGURE 6 also shows the members that are attached to the main frame, and which likewise engage the blocks 46. Thus, in conjunction with each block there is a structure consisting of members 51 and 52 which may be formed of steel plate secured together as by welding. Member 51 is disposed horizontally and seats upon the top of the block 46. Member 52 extends vertically and engages that side of the block opposite from the side engaged by member 48. FIGURE 6 shows this structure attached to a rigid plate or web 53, which in turn is attached to a rigid frame part 54 of the vehicle. Plate 53 may be extended to form a mounting for the corresponding wheel guard or fender 55. A member 56 is also attached to the members 51 and 52, and is engaged by that end of the rubber block remote from the axle assembly.

The construction and dimensioning is such as to permit the blocks to be compressed in any direction in cushioning shocks. Thus, the upper edges of each member 48 (FIGURE 6) is spaced a substantial distance from the adjacent edge of member 51. Likewise the lower edge of each member 52 is spaced a substantial distance from the adjacent edge of portion 32a. Thus, a substantial amount of compression of the block may occur in vertical and horizontal directions without causing direct engagement between the members 48 and 51, or between members 52 and the portions 32a. Likewise, as is evident from FIGURE 4, some movement in a direction longitudinally of the vehicle may occur between the beam structure 31 and the frame attached member 52, with such movements serving to compress one or the other of the blocks 46 in each suspension unit 21.

With suspension means of the type described above, it has been found that under certain extreme or severe operating conditions, the amount of torque developed cannot be absorbed by the suspension units without possible injury or displacement of the blocks 46. In this connection, particular reference can be made to operating conditions where it is necessary to rapidly reverse the drive, with the result that relatively heavy torques are developed and corresponding torque reactions are applied to the suspension units. The present invention makes possible the application of such heavy, sudden torque reactions without injury to the resilient cushioning blocks or associated parts. At the end of each suspension unit I provide a torque reaction device 61 which can be constructed as shown in FIGURE 7. Thus, a channel-shaped member 62 is attached to each member 52 at the end of the unit, and serves to contain the lower portion of a resilient (e.g. synthetic rubber) block 63. A channel-shaped member 64 engages the upper side of block 63, and is fixed to the beam portion 32a as by means of the mounting block 66 and the bolts 67. With this device at the ends of each suspension unit 21, it will be evident that any turning of the unit about the axis of the axle assembly and relative to the main frame of body part 10, is resisted by compression of one of the blocks 63 in each unit. At the same time the blocks 46 on the other side of the axle assembly will be compressed somewhat in resisting such torque. Application of torque as just described tends to cause movement of the axle assembly toward or away from the vehicle frame. Under such conditions, the moment arms formed by units 21 to resist torque may be effectively lengthened to the distance between the centers of blocks 46 and 63. In other words, under such conditions, the blocks 46 on one side of the axle assembly may serve as the effective turning axis of the torque arms that resist rotation, the other ends of the torque arms being the blocks 63.

Operation of my invention is as follows. Normally the weight of the vehicle is directly transmitted as vertical force components to the resilient blocks 46. When the machine is in operation, shocks are applied having vertical, transverse and longitudinal components. All such shocks are cushioned by the blocks 46. Transverse forces serve to compress the blocks in one or the other of the two units 21. Longitudinally forces are applied to compress either the forward or the rear blocks of the two units. Torques that are applied during varying operating conditions tending to turn the units with respect to the frame of the machine are applied to either the forward or rear torque devices whereby such turning is so limited that it does not cause any injury to the blocks 46.

In some instances it may be desirable to attach each rubber block 46 to the associated beam structure and the members attached to the machine frame. Thus, as shown in FIGURES 8 and 9, the opening 47 in the block may be fitted with clamp bars 71 and 72. Bar 71 is secured to member 52 by bolts 73, and bar 72 is similarly secured to member 48 by bolts 74. With this arrangement it will be evident that each of the resilient blocks 46 is secured to the relatively movable members with which it is associated.

Another and preferred embodiment of the suspension units 21 is shown in FIGURES 10–17. In this embodiment each unit consists of a rigid beam-like structure 111 which is clamped to the housing of the axle assembly 22. The beam 111 is formed of fabricated structural steel and includes a lower member 112 (FIGURE 16) which extends across the lower side of the axle. An upper member 113, likewise a steel plate, extends across the upper side of the axle assembly. The axle assembly includes as an integral portion a pad 114 which engages the vertically arranged spacers 116 secured to the lower member 112. A shim plate 117 is arranged between the pad and the upper plate 113, and the unit is tightly clamped upon the axle assembly by the bolts 118 and 119 that extend through the spacers. A spaced pair of upstanding webs or stiffening walls 121 are shown attached by welding to the lower member 112 and have their upper edges in abutting engagement with a flange forming plate 122. This plate is rigidly secured by bolts 123 to the upper member 113. A reinforcing stiffener or rib 124 (FIGURE 16) is welded to the lower member 112 to insure rigidity.

The ends of each beam structure 113 are in cooperative relation with members that are attached to the main frame of the body part 10 through cushioning members which may take the form of resilient blocks 146 similar to the blocks 46 previously described. By way of contrast to the form of suspension unit shown in FIGURES 3 and 4, the blocks 146 are arranged in an inclined relationship with respect to the beam structure 111 and the main frame of the body part 10.

Each end portion 112a of member 112 is inclined upwardly with respect to the general plane of the beam 111 and underlies and serves to seat a corresponding block 146. Each portion 112a is reinforced by a web 125. A wall 126 is secured by welding to the side edge of each portion 112a and provides a vertically extending surface against which one side of the corresponding block 146 engages. The ends of each block 146 nearest the axle assembly engages the upwardly inclined surface provided by a member forming the wall 127.

FIGURES 14 and 15 show the members that are attached to the main frame, and which likewise engage the blocks 146. Thus, in conjunction with each block there is a structure consisting of a side member 128 having secured transversely thereto, as by welding, a downwardly inclined inner member 129 and a downwardly inclined outer member 131. The member 128 extends vertically and engages that side of the block opposite from the side engaged by the member 126. The member 128 is rigidly secured to the plate 53 which in turn is attached to the frame part 54 of the vehicle. The inner top member 129 engages that surface of the block opposite from and parallel to the surface engaged by the inclined end portion 112a. The outer top member 131 engages that surface of the block opposite from and parallel to the surface in engagement with the inclined wall 127. Gusset plates 132 are arranged vertically between the frame part 54 and the members 128, 129, 131 to impart regidity to the structure which transmits the weight of the vehicle onto the corresponding cushioning block 146.

As was the case of the first described embodiment, the embodiment of FIGURES 10–17 is constructed and dimensioned to permit the blocks to be compressed in any direction. To this end, the lower edges of the inner top member 129 are spaced a substantial distance from the adjacent edges of the stiffening walls 121 and from the wall 127, as shown in FIGURE 15. Likewise, the lower edge of the vertically arranged side member 128 is spaced a substantial distance from the adjacent vertical edge of the end portion 112a, as shown in FIGURE 14. Also a substantial amount of compression of the block may occur in vertical and horizontal directions without causing a direct engagement between the members 126 and 129 or between the members 128 and 112a. From the foregoing it is evident that some movement in a direction longitudinally of the vehicle may occur between the beam structure 111 and the frame. Such movements serve to compress one or the other of the blocks in each suspension unit.

A desirable feature of the last described embodiment in which the cushioning blocks 146 are inclined is that the suspension units 21 and axle assembly 22 may be installed in the vehicle without making time consuming adjustments simply by moving the vehicular frame vertically into engagement with the blocks 146 carried by the rigid beam 111. It will be observed from FIGURE 10 that each block 146 is inclined or tilted with respect to the horizontal at an angle of approximately 30°, although any angle of between 20° and 45° is suitable. In this arrangement each block presents upwardly converging faces terminating in a corner which defines the uppermost portion of the block. Thus, when the beam 111 carrying the blocks 146 is moved vertically towards the vehicular frame during assembly, the upper corners of the blocks seek the corners defined by the inclined members 129, and 131 of the vehicular frame. There is little opportunity in this arrangement for the cushioned material of the block to bind against the members of the frame 129 and 131 or to become mispositioned. It has also been found that the tendency of the upper corner of the block to seek the corresponding corner defined by the members 129 to 131, assures that the axle assembly 22 will be maintained during service in an aligned condition with respect to the vehicular frame without the need for auxiliary alignment means. In other words, the blocks 146 furnish both a cushioning function as well as an axle locating an aligning function.

To prevent injury to the blocks resulting from the application of sudden heavy torque reactions, a torque reaction device 136 is provided at each end of the suspension unit (FIGURES 10, 13, 16–17). A resilient block 137 is maintained in close proximity to the undersurface of the inclined end portion 112a by means of a bracket mounted to the frame. More particularly, each block 137 is contained in a pocket formed in the upper portion 138 of the reaction device 136. The side plates 139 of each reaction device 136 are secured as by welding to the flange 141 which, in turn, is bolted to a plate member 142 that is welded to the side member 128. The torque reaction devices 136 function in the same manner as the reaction devices 61 described above.

It will be evident from the foregoing that I have provided a heavy duty vehicle having a number of desirable features. Particularly the resilient suspension adequately protects the power train of the vehicle with respect to severe shocks encountered during operation. In other words, the invention isolates the power train and the structural components from shock. The invention also permits higher operation speeds for the vehicle, thus making possible maximum compaction performance.

Maintenance is minimized because of the manner in which the power train is isolated, and because of the simple and rugged construction of the suspension units.

I claim:

1. In a heavy duty vehicle having a main frame and ground engaging means, an axle assembly extending transversely beneath the frame and connected to the ground engaging means, suspension means between the frame and the axle assembly serving to align and position said axle assembly longitudinally and laterally with respect to said frame, said suspension means including at least along one side of the vehicle center line a rigid beam-like structure extending longitudinally of the vehicle, means for mounting said beam-like structure on the axle assembly with the ends of the structure extending forwardly and rearwardly of the axle assembly, rigid frame supporting means secured to the frame and vertically disposed in spaced relation to the ends of the beam-like structure, and a pair of load supporting blocks of resilient material interposed between the ends of the beam-like structure and the frame supporting means, said frame supporting means and said beam-like structure respectively each having opposing, block engaging portions each comprising three converging surfaces engaging each block along three converging sides thereof, the opposing block engaging portions confining the block along all six sides thereof and serving to translate movement of the axle assembly into compressive deformation of the block.

2. The combination as in claim 1 in which each block is positioned to provide upper surfaces that are inclined downwardly from an upper corner of the block, the block engaging portion of the rigid frame supporting means including two inclined surfaces for engaging the inclined upper surfaces of the associated block.

3. In a heavy-duty vehicle having a main frame and ground engaging means, an axle assembly extending transversely beneath the frame and connected to the ground engaging means, two suspension units connected between the frame and said axle assembly serving to align the axle assembly longitudinally and laterally with respect to said frame, each suspension unit comprising a rigid, beam-like structure extending longitudinally of the vehicle, means for mounting said beam-like structure on the axle assembly with the ends of the structure extending forwardly and rearwardly of the axle assembly, rigid frame supporting means secured to the frame and vertically disposed in spaced relation to the ends of each beam-like structure, a pair of load supporting blocks of resilient material interposed between the ends of each beam-like structure and the frame supporting means, each end of each beam structure forming means including three converging surfaces engaging an associated block on three converging sides thereof, the frame supporting means associated with each end of each beam structure forming means including three converging surfaces engaging the block on its three other converging sides, and further means comprising members of resilient material interposed between the ends of each beam structure and said frame supporting means for resisting rotational movement of the beam structures with respect to the vehicular frame.

4. A vehicle as in claim 3 in which each block is formed and disposed to provide upper surfaces inclined downwardly from an upper corner of the block and lower surfaces inclined upwardly from a lower corner of the block, the beamlike structure having members forming inclined surfaces for seating the blocks and the frame supporting means having portions providing inclined surfaces for seating on the blocks.

References Cited

UNITED STATES PATENTS

| | | | |
|---|---|---|---|
| 2,995,383 | 8/1961 | Barker | 280—124 |
| 2,752,166 | 6/1956 | Hickman | 280—124 |
| 3,081,292 | 3/1963 | Bennett | 267—63 X |
| 3,011,776 | 12/1961 | Reed | 267—63 |

FOREIGN PATENTS 1,218,312  12/1959  France.

PHILIP GOODMAN, Primary Examiner

U.S. Cl. X.R.

267—63